H. A. LEWIS.
AUTOMATIC RELEASE.
APPLICATION FILED MAR. 9, 1916.
1,195,824.
Patented Aug. 22, 1916.
3 SHEETS—SHEET 1.
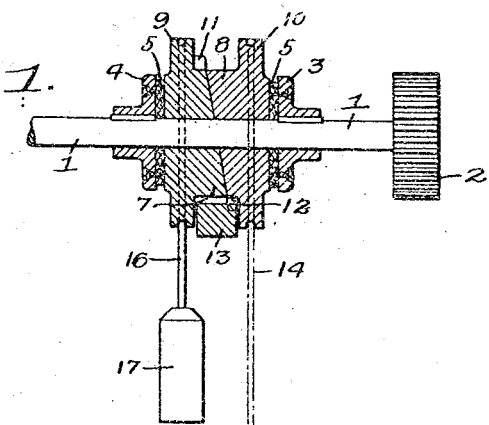
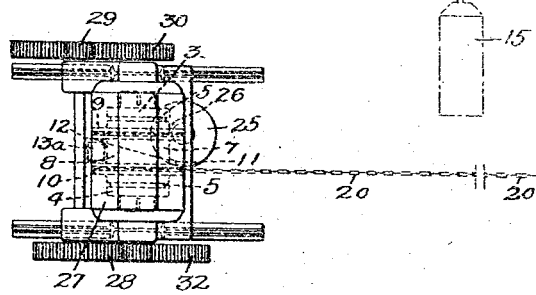
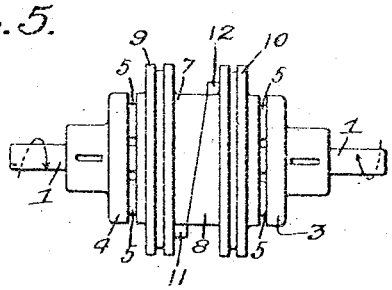
Inventor
Harry A. Lewis
by his Attorneys
Howson & Howson

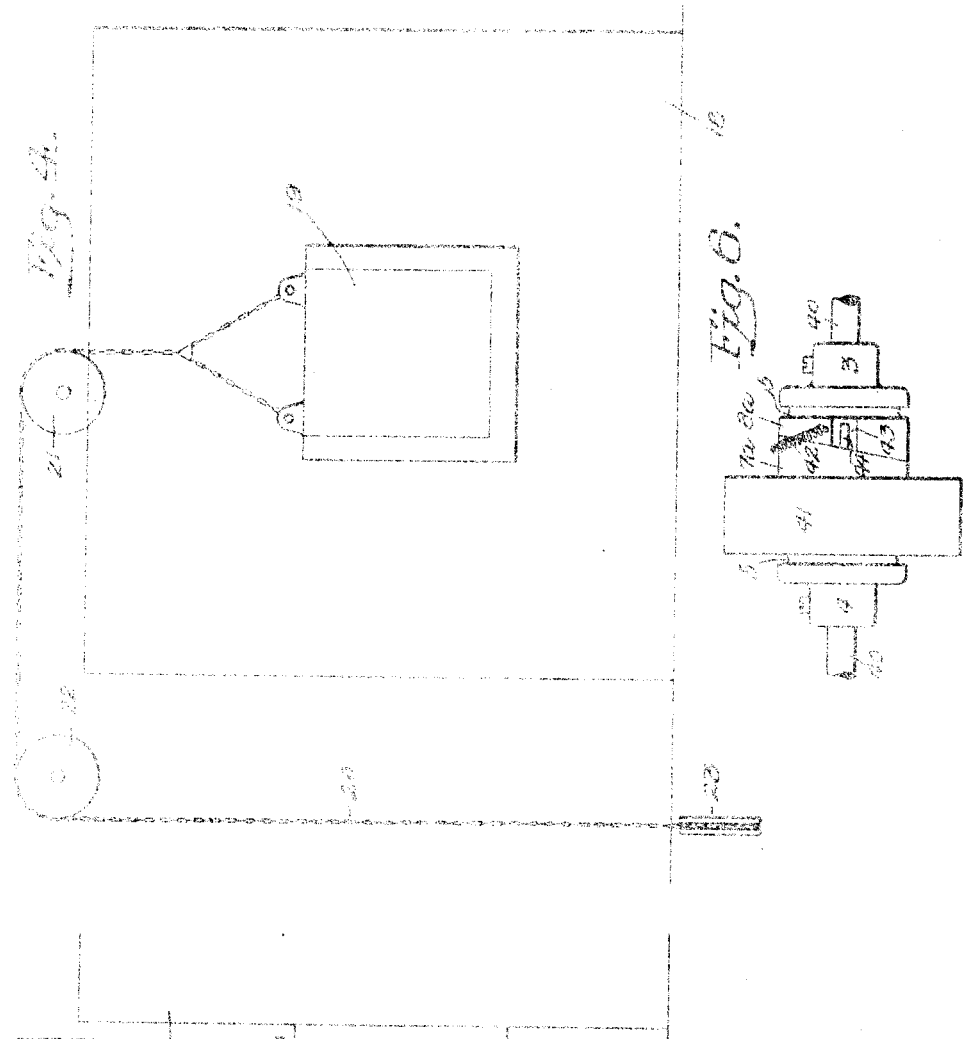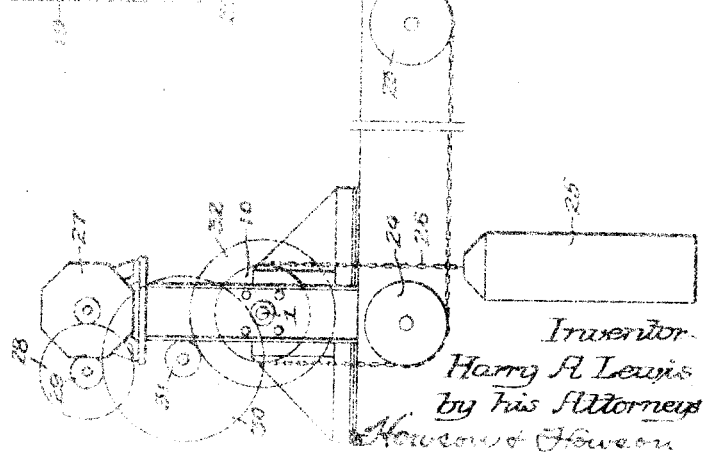

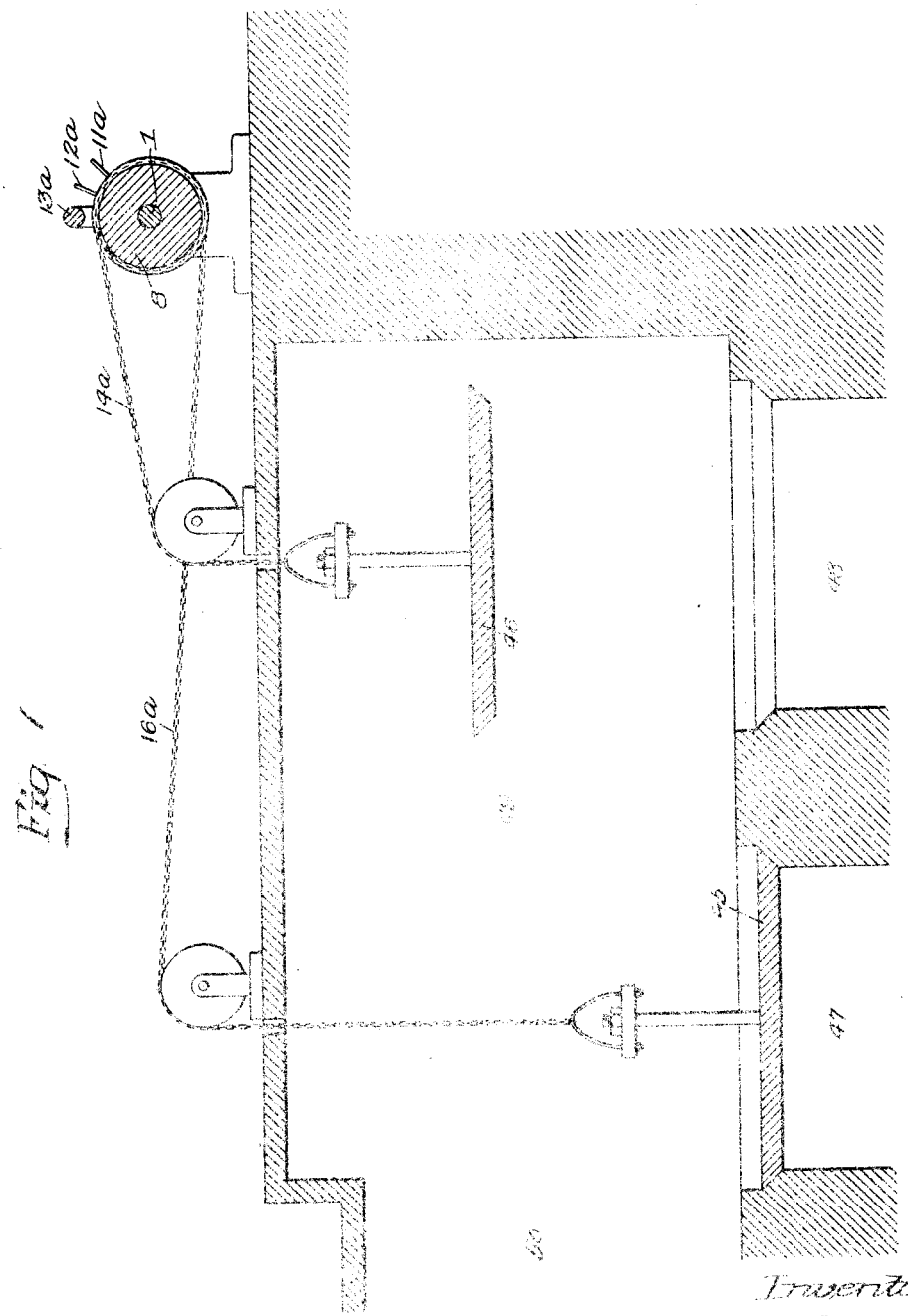

UNITED STATES PATENT OFFICE.

HARRY A. LEWIS, OF NORRISTOWN, PENNSYLVANIA.

AUTOMATIC RELEASE.

1,195,824.  Specification of Letters Patent.  Patented Aug. 22, 1916.

Application filed March 9, 1916. Serial No. 83,132.

*To all whom it may concern:*

Be it known that I, HARRY A. LEWIS, a citizen of the United States, residing in Norristown, Montgomery county, State of Pennsylvania, have invented an Automatic Release, of which the following is a specification.

One object of my invention is to provide an automatically acting mechanical device designed for interposition between a driving and a driven member and so constructed that under predetermined conditions such as when the load on the driven member exceeds a predetermined amount, it will be automatically disconnected from the driving member with a view to preventing such damage as might result from overloading.

More particularly it is desired to provide a device available for use with lifts, skip hoists and hoisting devices of all kinds driven by an electric or other motor and including a member to be raised to a certain height or brought to a definite position, which device shall automatically act to disconnect the motor from the member driven thereby when the latter is brought to a definite point or in one form of the invention, when the speed of said driven member exceeds that of the driving member.

These objects and other advantageous ends I secure as hereinafter set forth, reference being had to the accompanying drawings, in which—

Figure 1 is a vertical section illustrating a simple form of my invention; Figs. 2, 3, and 4 are respectively a plan, a side and a front elevation illustrating my invention as employed to operate a furnace door; Fig. 5 is an elevation of the drum forming part of the invention; Fig. 6 is an elevation of a form of the invention particularly adapted to connect a starting motor with the shaft of an internal combustion engine; and Fig. 7 is an elevation partly in section showing the device arranged to operate a pair of valves.

In Fig. 1 of the above drawings, 1 represents a shaft having fixed to it a gear 2 or other member whereby it may be driven in either direction from a suitable source of power. Fixed to this shaft, in the present instance by means of keys, are a pair of shoulders in the form of disks 3 and 4 having on their adjacent faces plates 5 of suitable friction material such for example as is employed on braking surfaces. Between these two shoulders I loosely mount upon the shaft two substantially cylindrical members 7 and 8 having inclined coacting faces lying in a plane at an acute angle to a radial plane of the shaft 1;—the arrangement being such that a rotary movement of one of said members relatively to the other will necessarily cause them to move apart and jam against or grip the friction material on the disks 3 and 4. The member 7 carries or has formed integral with it a drum or grooved wheel 9 and the member 8 likewise has a second drum or grooved wheel 10. Moreover said two members are provided with projections in the form of lugs 11 and 12 both capable of engaging a fixed abutment structure 13 so as to prevent revolution of their respective members; although it is to be noted that under certain conditions these lugs may be omitted without departing from my invention.

To the drum 10 is attached one end of a cable 14 whose second end is connected to a body 15 to be moved while a second cable 16 is connected to the drum 9 so as to be wound thereon in a direction opposite the cable 14 on said first drum, the second end of the cable 16 being connected to another body 17 to be operated or moved.

With the arrangement shown it is assumed that when viewed from the right hand end of the apparatus, the cable 14 shall be wound on its drum 10 so that the body 15 will be raised by a clockwise rotation of the member 8, while such rotation of the cable 16 to unwind and lower the body 17. Moreover, these two bodies, acting through their cables, relatively turn the members 7 and 8 through a small angle, causing their inclined coacting faces to move them laterally and normally grip them to the friction disks 5, so that if the shaft 1 be turned in a clockwise direction they are turned with the disks 3 and 4 and the shaft 1, thus raising the body 15 and lowering the body 17. When the body 15 has been raised to the desired height, the parts are so proportioned that the lug 11 comes into contact with the abutment 13, thus stopping rotation of the member 7. Obviously a very slight continued forward clockwise movement of the member 8 serves to release it from a condition in which it is jammed between its disk 5 and the member 7, to its neutral position in which it does not grip its disk 5 with sufficient force to be rotated by the shaft 1, and as a consequence, the latter with the disks is free to rotate while the members 8 and 7 are operatively disconnected from it, though held in the positions to which they have been brought. The shaft 1 may thus continue its operation without overloading the source of power by which it is driven.

It has been assumed that the bodies 15 and 17 are of substantially equal mass, and when the direction of rotation of the shaft 1 is reversed so that with its associated parts it turns in a counter-clockwise direction, they at once act to again force the members 7 and 8 apart and cause them to grip the friction plates 5. As they therefor turn with the shaft 1, the lug 11 moves away from the abutment 13, the body 17 is raised and the body 15 is lowered until the lug 12 engages said abutment. Thereupon the slight relative movement given by the shaft to the member 7 independently of the member 8 permits said two members to move toward each other and occupy less space between the disks 5, thus again operatively disconnecting them from the shaft 1. If desired, the angle of the coacting faces of the members 7 and 8 may be such that the engagement of one of the bodies with a fixed abutment or support after it has been lowered a predetermined distance permits said members to slip while still holding the second body in its elevated position.

One practical application of the device is shown in Figs. 2 to 4 inclusive, where 18 represents a furnace having a vertically movable door 19, connected by a chain 20 guided over suitable pulleys 21, 22, 23 and 24 to a grooved pulley or drum 10, to which it is connected in such manner that when said door is in its closed position said chain is practically unwound from said drum. A counter-weight 25, substantially balancing the door 19, is hung from a chain 26, which when said door is closed, is wound on a second drum 9. As before, these pulleys or drums are mounted on or formed as part of two members 7 and 8 loosely carried by the shaft 1 and each having inclined faces operatively engaging each other in a plane at an acute angle to a radial plane of the shaft. Two disks 3 and 4 are fixed to the shaft 1 immediately adjacent the members 7 and 8 and bodies of friction material 5 are preferably interposed between the latter and said disks. The latter are provided with projecting lugs 11 and 12 placed to engage fixed abutments provided as described in connection with Fig. 1, and in this case the shaft 1 is driven from an electric motor 27 through a train of gears 28—32. The furnace door 19 and weight 25 so act upon the members 7 and 8 that their coacting surfaces wedge them apart into gripping engagement with the faces of the disks 3 and 4, and if it be desired to open said door, the motor 27 is caused to operate so that it turns the shaft 1 in a clockwise direction. (Fig. 3). The members 7 and 8 being gripped to said shaft as above described, the chain 26 supporting the weight 25 is unwound from its drum 9 while the chain 20 attached to the door is wound upon its drum 10, thereby moving said door to its raised or open position. At the time the door reaches such position, the lug 11 of the member 7 strikes its abutment 13, Fig. 3, thus slightly turning said member on the shaft respectively to the member 8, so that both of said members are released from friction plates 5 and stop turning, even though the motor should not be stopped. Obviously upon reversing the direction of rotation of the motor, the two members 7 and 8 are again jammed between the disks 3 and 4 under the action of the weight of the door and of the counter-weight 25 so that the latter is raised and the door is lowered to its closed position. The lug 12 then strikes its abutment and automatically disconnects the two members from the driving shaft, thus leaving this free to turn without possibility of injury to any of the parts, or danger of overloading the motor.

Another useful application of my invention is shown in Fig. 5, which illustrates it as designed for use on the cross feed of a lathe or as part of the connection between an engine shaft 40 and a pulley or other member 41 driven from an engine starting motor. As before, I provide a pair of shoulders in the form of disks 3 and 4 fixed to the shaft and having friction plates 5 on their adjacent faces. Between these plates I loosely mount on the shaft the member 41 and provide the same with a projecting portion or member 7 having an inclined face designed to coact with the similarly inclined face of a member 8 also loose on the shaft 40. These two members 7 and 8 are provided with apertures for the attachment of, or are connected by, a spring 42 tending to relatively turn them upon the shaft so as to cause them to jam against the friction plates 5. In addition the member 8 has a peripheral recess 43 while the member 7 has a pin or projection 44 extending into said recess so as to limit the possible relative rotation of said two members. With the above described arrangement of parts, if a starting motor should rotate the member 41 in a counter-clockwise direction (when it is viewed from the right hand side) the members 7 and 8 so coact as to couple the member 41 to the shaft 40, which is thus turned and caused to crank the engine attached to it. As soon as said engine begins to operate under its own power, the shaft 40 is turned at a speed higher than that of the member 41, whereupon the latter is automatically disconnected from said shaft, since as before the friction disks 5, in acting upon the members 7ª and 8ª turns one of these relatively to the other to such an extent that they are no longer jammed outwardly into holding engagement with said members.

It is particularly to be noted that although the door and weight or whatever other members or devices are actuated by the driving means are certainly disconnected therefrom under predetermined conditions such that the motor is not overloaded nor any parts damaged, said members, to wit, the door and counterweight in one of the cases illustrated, are held in their given positions regardless of whether or not the shaft upon which they are mounted, is turned. If the lugs 11 and 12 should be omitted, the members 7 and 8 are none the less automatically disconnected from the shaft 1 when the load on either of them exceeds a definite maximum, for in such case said members would slip relatively to the disks 3 and 4.

In Fig. 7 I have illustrated my invention as applied for the operation of two valves 45 and 46 placed to control the flow of gas from a conduit 50 to either of two branch passages 47 and 48. In this case said valves take the place of the door 19 and the weight 25 respectively, and as before these structures to be moved from the motor which drives the shaft 1, are connected to said shaft through drums on which are wound the cables 14ª and 16ª leading from the valves. Each drum has a projection, and these two parts, indicated at 11ª and 12ª, are designed to coact with a fixed member 13ª similar in its functions to the part 13 of Fig. 1.

I claim:—

1. The combination of a driving shaft; two abutments thereon; two members loose on the shaft between the abutments and having faces inclined at an angle to their axis of revolution for causing them to grip the abutments when either member turns relatively to the other; a device to be driven connected to said members; and means for preventing revolution of one of the members after it has been turned by the shaft to a predetermined extent.

2. The combination of a driving shaft; two abutments thereon; two members loose on the shaft between the abutments and having faces inclined at an angle to their axis of revolution for causing them to grip the abutments when either member turns relatively to the other; a device to be actuated connected to one of said members; and means for causing the member to be automatically released from the driving action of the shaft after said member has been driven thereby to a predetermined extent.

3. The combination of a driving shaft having abutments; a member loose on the shaft between the abutments and having a face inclined at an angle to its axis of revolution; means for causing said member to be jammed between said abutments under predetermined conditions; a device to be driven operatively connected to said member; and means for automatically releasing the member from the driving action of the shaft after said member has been turned thereby to a predetermined extent.

4. The combination of a driving shaft; two abutments thereon; two members loose on the shaft between the abutments and having coacting faces inclined at an angle to their axis of rotation for causing them to grip the abutments when either member turns relatively to the other; a device to be driven operatively connected to one of the members; and means for automatically releasing said latter member from the shaft under predetermined conditions.

5. The combination of a driving shaft; two abutments thereon; two members loose on the shaft between the abutments and having coacting faces inclined at an angle to their axis of rotation for causing them to grip the abutments when either member turns relatively to the other; a device to be driven operatively connected to one of the members; a relatively fixed structure; and means placed to coact with said fixed structure, after said latter member has been turned by the shaft to a predetermined extent, for releasing it from said shaft.

6. The combination of a driving shaft; two abutments thereon; two drums mounted between the abutments and having coacting faces inclined at an acute angle to a radial plane of the shaft for causing them to grip the abutments when either drum is turned relatively to the other; cables for said drums, structures to be moved respectively connected to said cables; and means for automatically releasing said drums from the shaft after they have made a predetermined number of revolutions.

7. The combination of a driving shaft; two abutments thereon; two drums mounted between the abutments and having coacting faces inclined at an acute angle to a radial plane of the shaft for causing them to grip the abutments when either drum is turned relatively to the other; cables for said drums; structures to be moved respectively connected to said cables; and means for automatically releasing said drums from the shaft after they have made a predetermined number of revolutions in either direction.

8. The combination of a driving shaft; two abutments thereon; two members loose on the shaft between the abutments and having faces inclined to their axis of revolution for causing them to grip the abutments when either member turns relatively to the other; two devices to be actuated respectively connected to said members; and means for automatically releasing the members from the shaft after they have been turned to a predetermined extent thereby.

9. The combination of a shaft; two abutments thereon; two members loose on the shaft between the abutments, having faces frictionally engaging said abutments respectively, and also having coacting faces inclined to their axis of revolution for causing them to grip the abutments when either member turns relatively to the other; two devices to be actuated respectively connected to said members; and means for automatically disconnecting the members from the shaft after the latter has rotated them to a predetermined extent.

10. The combination of a driving shaft; two abutments thereon; two drums loose on the shaft frictionally engaging said abutments and having coacting faces inclined to their axis of revolution; two cables wound in opposite directions on said drums; members to be actuated connected to said cables; and means for causing relative movement of said drums in a direction to automatically disconnect them from the shaft after they have been turned thereby to a predetermined extent.

11. The combination of a driving shaft; two abutments thereon; two members loose on the shaft between the abutments having faces inclined at an angle to their axis of revolution and formed to automatically jam between the abutments when relatively moved in one direction; a device to be actuated by one of said members; and means for automatically causing relative movement of the members sufficient to operatively disconnect them from the shaft after they have been turned thereby to a predetermined extent.

12. The combination of a shaft rotatable in either of two directions; two abutments fixed thereto; two members loose on the shaft between the abutments and capable of frictionally gripping the same, said members having coacting faces inclined at an angle to their axis of revolution; driven devices operatively connected to said members and normally tending to turn them relatively to each other to cause them to jam between the abutments; and means for causing relative movement of said members in an opposite direction to cause them to be automatically released from said abutments after they have been turned by the shaft to a predetermined extent.

13. The combination of a shaft rotatable in either of two directions; two abutments fixed thereto; two members loose on the shaft between the abutments and capable of frictionally gripping the same, said members having coacting faces inclined at an angle to their axis of revolution; driven devices operatively connected to said members and normally tending to turn them relatively to each other to cause them to jam between the abutments; lugs for said members; and a fixed structure placed to be engaged by said lugs under predetermined conditions to cause their relative movement and consequent release from the shaft.

14. The combination of a shaft; two relatively movable members loose thereon and having inclined coacting faces; a device to be actuated connected to one of said members; and means for causing the members to be non-rotatably gripped to the shaft when one of them turns relatively to the other; and means for automatically releasing one of said members from the shaft after the former has turned through a predetermined angle.

15. The combination of a shaft; two abutments thereon; two members loose on the shaft between said abutments and having inclined coacting faces which force them apart into gripping engagement with the abutments when one of them is turned relatively to the other; with means for preventing revolution of one of the members after it has turned through a predetermined angle.

HARRY A. LEWIS